United States Patent
Kuzmenka et al.

(10) Patent No.: US 7,188,204 B2
(45) Date of Patent: Mar. 6, 2007

(54) MEMORY UNIT AND BRANCHED COMMAND/ADDRESS BUS ARCHITECTURE BETWEEN A MEMORY REGISTER AND A PLURALITY OF MEMORY UNITS

(75) Inventors: Maksim Kuzmenka, München (DE); Siva Raghuram Chennupati, Germering (DE)

(73) Assignee: Infineon Technologies AG, Munich (DE)

( * ) Notice: Subject to any disclaimer, the term of this patent is extended or adjusted under 35 U.S.C. 154(b) by 431 days.

(21) Appl. No.: 10/325,250

(22) Filed: Dec. 19, 2002

(65) Prior Publication Data
US 2003/0131211 A1    Jul. 10, 2003

(30) Foreign Application Priority Data
Dec. 19, 2001   (DE)   ............... 101 62 583

(51) Int. Cl.
*G06F 1/00*   (2006.01)
(52) U.S. Cl. ..................... 710/300; 711/200
(58) Field of Classification Search ............... 710/200, 710/300–306, 312–315, 24–27, 38, 108; 365/52, 63, 233, 104, 99; 711/163, 154, 711/200
See application file for complete search history.

(56) References Cited

U.S. PATENT DOCUMENTS

| | | | | |
|---|---|---|---|---|
| 5,101,478 A | * | 3/1992 | Fu et al. | ............. 710/1 |
| 5,109,168 A | | 4/1992 | Rusu | |
| 5,216,637 A | | 6/1993 | Vaillancourt | |
| 6,028,781 A | * | 2/2000 | Vogley et al. | ........... 365/52 |
| 6,338,113 B1 | * | 1/2002 | Kubo et al. | ............. 711/105 |
| 6,349,051 B1 | * | 2/2002 | Klein | ............. 365/63 |
| 6,411,539 B2 | * | 6/2002 | Funaba et al. | ........... 365/63 |
| 6,819,625 B2 | * | 11/2004 | Ruckerbauer et al. | ...... 365/233 |
| 2002/0083255 A1 | * | 6/2002 | Greeff et al. | ........... 710/305 |
| 2003/0005209 A1 | * | 1/2003 | Ozawa | ........... 710/316 |

FOREIGN PATENT DOCUMENTS

| | | | |
|---|---|---|---|
| DE | 100 08 585 A1 | | 10/2000 |
| EP | 0 501 652 | | 9/1992 |
| EP | 1383052 | * | 1/2004 |
| JP | 2000 242 687 A | | 9/2000 |
| WO | WO 00/01207 | * | 1/2000 |
| WO | WO 00/75796 | * | 12/2000 |

\* cited by examiner

*Primary Examiner*—Mark H. Rinehart
*Assistant Examiner*—Raymond N Phan
(74) *Attorney, Agent, or Firm*—Laurence A. Greer; Werner H. Stemer; Ralph E. Locher

(57) ABSTRACT

A branched command/address bus architecture between a memory register and a plurality of memory units includes a main bus connected to the memory register. A first sub-bus is connected to the main bus and branches into a first number of memory unit buses, wherein each of them is connected to a command/address input of a memory unit associated with the same. A second sub-bus is also connected to the main bus and branches into a second number of memory unit buses, wherein each of them is connected to a command/address input of a memory unit associated with the same, wherein the second number is smaller than the first number. Further, the second sub-bus branches into a number of auxiliary buses, wherein the number of auxiliary buses corresponds to the difference between the first number and the second number, wherein each auxiliary bus is capacitively loaded corresponding to the memory unit buses and does not serve for driving a memory unit.

7 Claims, 2 Drawing Sheets

MEMORY UNIT AND BRANCHED COMMAND/ADDRESS BUS ARCHITECTURE BETWEEN A MEMORY REGISTER AND A PLURALITY OF MEMORY UNITS

BACKGROUND OF THE INVENTION

1. Field of the Invention

The present invention relates to a branched command/address bus architecture for registered memory units between a memory register and a plurality of memory units of a memory module.

2. Description of Prior Art

In memory architectures with registered memory units and memory chips, respectively, a suitable command/address bus architecture must be provided between the memory register and the memory units. In such an architecture a main bus connected to the memory register branches into a plurality of memory unit buses, wherein each memory unit bus is connected to an associated memory unit. Depending on the memory unit number used and the arrangement of the same, respectively, an asymmetric network may result by realizing such a bus branching, which is not symmetrical and balanced, respectively, due to the unbalanced distribution of the loads connected to the respective sub-branches of the network. Such an asymmetry results if a first sub-bus which is connected to a main bus connected to the memory register branches into a plurality of memory unit buses, while a second sub-bus also connected to the main bus branches into a second number of memory unit buses which is less than the first number.

In order to balance an asymmetry of the above-described type, an extra trace length has been used for the sub-bus which branches into the smaller number of memory unit buses in order to achieve a greater delay for this less loaded sub-bus or branch, respectively. With this approach, however, an unbalance and an asymmetry remain, respectively, which may cause an overshoot (ringing) and a slope reversal. These effects of a "ringing" or of oscillations caused due to the asymmetry degrade the signal quality considerably.

SUMMARY OF THE INVENTION

It is the object of the present invention to provide a branched command/address bus architecture for registered memory units having an improved signal quality between memory units and the memory register, and a memory unit which is useable for such an architecture.

This object is achieved by a branched command/address bus architecture between a memory register and a plurality of memory units, comprising:

a main bus connected to the memory register;

a first sub-bus which is connected to the main bus and branches into a first number of memory unit buses, wherein each of the same is connected to a command/address input of a memory unit associated with the same; and a second sub-bus which is connected to the main bus and branches at follows:

into a first number of memory unit buses, wherein each of them is connected to a command step/address input of a memory unit associated with the same, wherein the second number is smaller than the first number, and into a number of auxiliary buses, wherein the number of auxiliary buses corresponds to the difference between the first number and the second number, wherein each auxiliary bus is capacitively loaded corresponding to the memory unit buses and does not serve for driving a memory unit.

The present invention is based on the findings that the signal quality between the memory register and the memory units may be improved significantly, when the topology of the command/address bus architecture between the memory register and the memory units is made electrically symmetric and electrically balanced, respectively. According to the invention this is realized by providing an auxiliary bus, which is loaded with a capacity corresponding to the capacity with which the memory unit buses are loaded, for the sub-bus branching into a smaller number of memory unit buses. Thus, an electrically symmetric topology is achieved, so that the disadvantages according to the prior art may be avoided.

According to a first embodiment of the present invention this capacitive loading of an auxiliary bus is achieved by at least providing one memory unit with an additional input comprising the same structure as the command/address input of this memory unit and therefore the same input capacity. The auxiliary bus is connected to this additional input of the memory unit.

According to a further aspect of the invention, the above object is achieved by a memory unit, comprising:

a command/address input for receiving command/address signals via a memory unit bus from a memory register, wherein the command/address input comprises an input capacity; and an additional auxiliary input comprising the same input capacity as the command/address input.

An input capacity corresponding to the command/address input may preferably be realized by the auxiliary input having the same structure as the command/address input of the corresponding memory unit.

In a memory topology using the inventive command/address bus architecture and the inventive memory unit, respectively, any memory units may comprise the above-described setup, so that no different designs of memory units need to be used. In such a case it is advantageous to use N/C inputs, i.e. actually non-connected inputs, usually comprising memory chips as virtual loads. Typical BGA housings for example comprise a plurality of unused inputs, i.e. terminals which may be connected to the ESD structure of the chip, so that they may be used as virtual loads for compensating asymmetric networks. This causes no further costs, as already present additional terminals may be used.

Alternatively, it is of course sufficient if such a memory unit is only made available for each of the auxiliary buses, wherein usually only one auxiliary bus will be provided, as the number of memory unit buses branching into the respective sub-buses will only differ by one with an odd number of memory units.

According to an alternative embodiment of the present invention, the load capacity for the auxiliary bus may be provided by a capacitor whose capacity corresponds to the input capacity of the command/address input of the memory units. Such a capacitor may be advantageously provided on the printed circuit board on which the command/address bus structure is provided, in the form of a printed capacitor.

BRIEF DESCRIPTION OF THE DRAWINGS

In the following, preferred embodiments of the present invention are explained in more detail referring to the accompanying drawings, in which.

DESCRIPTION OF PREFERRED EMBODIMENTS

Figure 1:
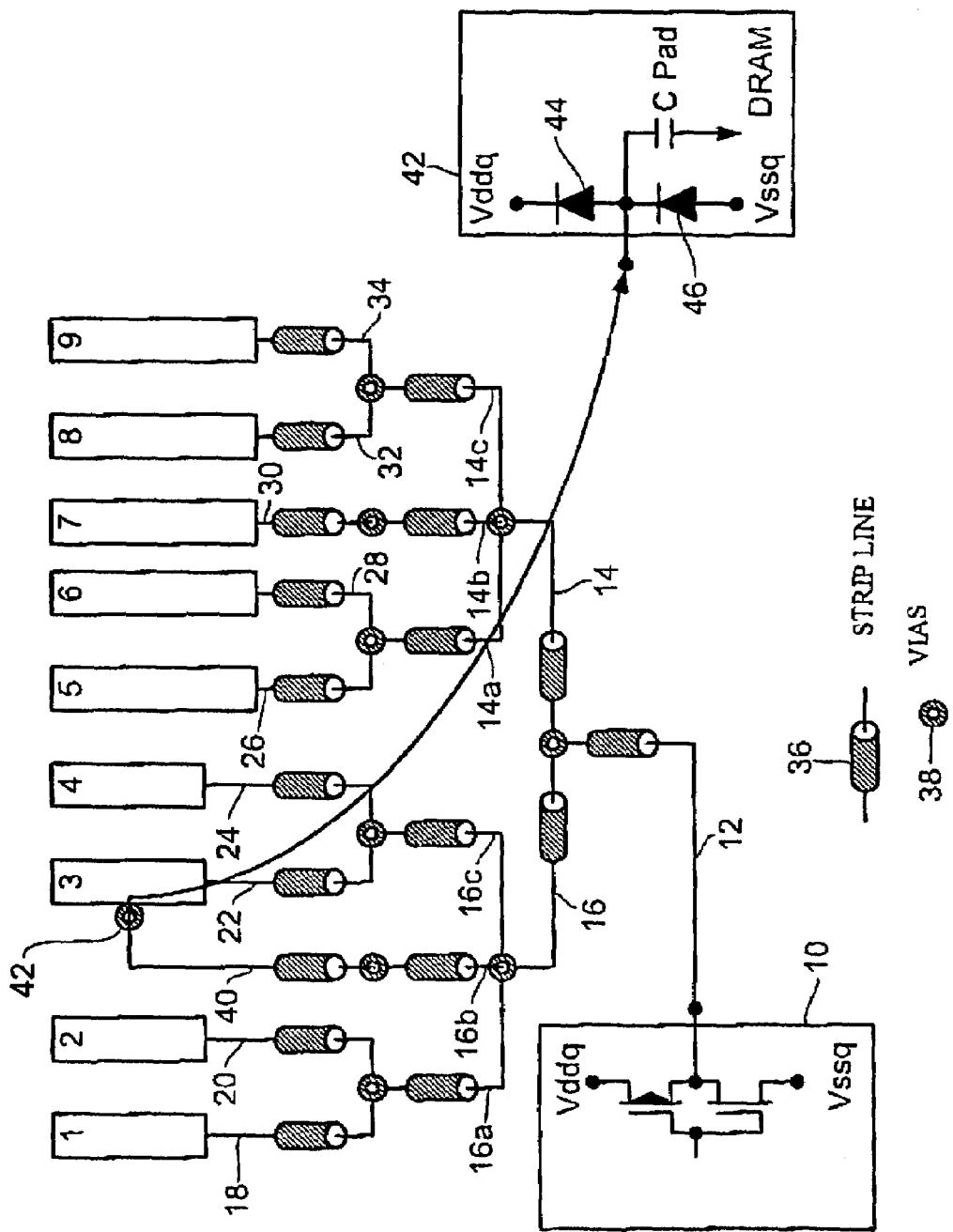
FIG. 1 shows a schematical diagram of a first embodiment of the inventive branched command/address bus architecture.

Referring to FIG. 1 first of all a first embodiment of the present invention is explained in the following, wherein additional pins of a memory unit, representing an auxiliary input of this memory unit connected to an auxiliary bus, emulate an additional memory unit in a branch connected to a smaller number of memory units.

As it is illustrated in FIG. 1, nine memory units designated by the reference numerals 1 to 9 and which may for example be formed by memory chips are connected to a memory register 10 via a plurality of strip lines and vias. The memory units 1 to 9 may for example be DDR DRAM memory chips (DDR=double data rate; DRAM=dynamic random access memory). The memory units 1, 2 and 4 to 9 comprise a conventional design known to those skilled in the art, and therefore do not have to be explained any further. Equally, the memory register 10 comprises a conventional design and accesses available potentials, for example Vddq and Vssq, so that a further explanation of the memory register 10 is omitted.

A main bus 12 is connected to the memory register 10, branching into two sub-buses 14 and 16. The sub-bus 14 branches into partial sub-buses 14a, 14b and 14c, the sub-bus 16 branches into the partial sub-buses 16a, 16b and 16c. The partial sub-bus 16a branches into memory unit buses 18 and 20, connected to the memory units 1 and 2, respectively. The partial sub-bus 16c branches into the memory unit buses 22 and 24, connected to the memory units 3 and 4, respectively. The partial sub-bus 14a branches into the memory unit buses 26 and 28, connected to memory units 5 and 6, respectively. The partial sub-bus 14b changes into a memory unit bus 30 which is connected to the memory unit 7. The partial sub-bus 14c branches into the memory unit buses 32 and 34 which are connected to the memory unit 8 and the memory unit 9, respectively. Each memory unit bus is thereby respectively connected to the command/address input of the respective memory unit. For a 22 bit command/address bus six pins per memory unit (6×4=24) are needed, wherein the respective buses comprise a corresponding structure.

As it can be seen in the legend of FIG. 1, the respective buses in the illustrated embodiment are realized by strip lines 36 and vias 38.

With the topology illustrated in FIG. 1, the sub-bus 14 branches into five memory unit buses 26, 28, 30, 32 and 34 which are connected to the five memory units 5, 6, 7, 8 and 9, respectively. In contrast, the sub-bus 16 only branches into four memory unit buses 18, 20, 22 and 24 which are connected to the memory units 1, 2, 3 and 4. Therefore, no symmetric distribution regarding the loads of the two sub-buses 14 and 16 exists.

According to the invention, an auxiliary bus 40 is thus provided, which is connected to an additional or auxiliary input 42, respectively, of the memory unit 3. The auxiliary input 42 internally comprises the same structure within the memory unit 3 as the normal command/address input of the memory unit which is connected to the memory unit bus 22. Correspondingly, the pins of the auxiliary input 42 correspond to the pins of the normal command/address input of the memory unit, wherein in FIG. 1 the setup of the input for one pin is illustrated. Like the pins of the normal command/address input this one is connected to a pad capacity CPad, wherein the ESD structures 44 and 46 are provided to the respective chip potentials Vddq and Vssq. Through the illustrated construction each pin of the auxiliary input 42 sees the same capacity as a corresponding command/address input pin, so that the input capacity of the auxiliary input 42 corresponds to the capacity of the command/address input of the memory units. Thus, the auxiliary input 42 emulates a fifth memory unit for the sub-bus 16 into the memory unit 3, so that a symmetric command/address bus architecture is provided.

Figure 2:
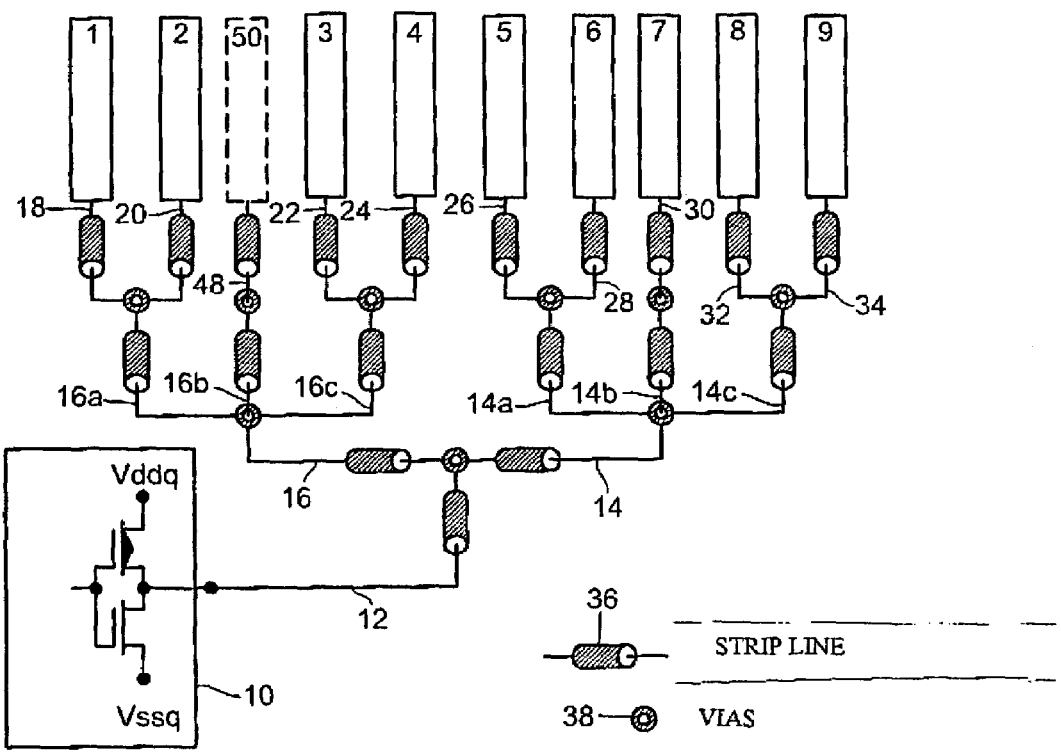
FIG. 2 shows a schematical illustration of a second embodiment of the inventive command/address bus architecture.

In FIG. 2 a second embodiment of an inventive branched command/address bus architecture is illustrated, wherein elements corresponding to those in FIG. 1 are designated with the same reference numerals. According to the second embodiment, an auxiliary bus 48 is further provided which is connected to the partial sub-bus 16b. In this case, however, each virtual memory unit 50 is provided in order to achieve a symmetrical topology. This "virtual" memory unit 50 is formed by a capacitor emulating a fifth memory unit in the branch of the sub-bus 16, so that the network is geometrically symmetric and balanced.

The capacity of the capacitor forming the "virtual" memory unit corresponds to the capacity of the command/address input of the real memory units 1 to 9.

Figure 3A:
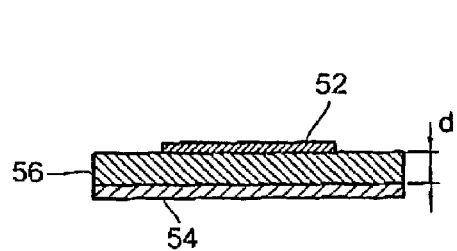
FIGS. 3a and 3b show a schematical sectional view and a top plane view, respectively, of a capacitor, as it is used with the branched command/address bus architecture of FIG. 2.
Figure 3B:
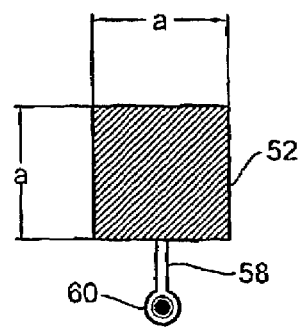

A preferred possibility for realizing the capacitor forming the virtual memory unit 50 is illustrated in the FIGS. 3a and 3b. As it can be seen in the sectional view of FIG. 3a, the capacitor is preferably a printed copper capacitor comprising a capacitor electrode 52, a counter electrode 54 which may be on a ground potential or a VDD potential and therefore may be formed by the GND or the VCC layer, and a dielectric 56 arranged between the electrodes. The electrodes 52 and 54 may preferably consist of copper. The dielectric 56 may preferably be part of the circuit board on which the inventive bus architecture is formed. FIG. 3b illustrates a top view onto the capacitor, wherein the capacitor electrode 52 is provided with a corresponding capacitor terminal structure 58. For example, the capacitor electrode 52 may be connected by a via 60.

In order to emulate the input capacity of the memory units 1 to 9, the capacity of the capacitor is adjusted to the capacity of the C/A inputs of conventional DDR DRAM chips of about 2.5 pF. In order to realize such a capacity using a capacitor as it is shown in FIG. 3a and FIG. 3b, if the dielectric 56 comprises a thickness d of 4.2 µm, then the capacitor electrode 52 needs to comprise an area of 6 mm², wherein with a square form of the same an adjusted edge length a needs to be provided. The capacitor electrode may, however, also comprise any other geometrical forms.

According to the invention, a symmetric command/address bus architecture for registered memory units is therefore provided, by respectively providing one auxiliary bus to which a capacitive load emulating an additional memory unit is applied. It need not be explained that in the inventive command/address bus architecture the respective bus lines in the form of strip lines and vias in the illustrated embodiments are preferably implemented so that a basically geometrically symmetric design is achieved so that an asymmetry in the form of an asymmetric load is not caused by the configuration of the lines and the vias alone.

The present invention therefore provides a geometrically and electrically symmetric network between the memory register and the memory units, so that compared to known asymmetric bus architectures less oscillations and less overshoot and undershoot occurs. In addition, the present invention manages with a smaller number of additional components. If inventive memory units with an additional input terminal are used, then only one additional auxiliary bus for this auxiliary input of the memory unit needs to be provided. Alternatively, in addition to this auxiliary bus only one capacitor or one capacity, respectively, of the required magnitude is to be implemented.

Reference Numerals List:

| | |
|---|---|
| 1 to 9 | memory units |
| 10 | memory register |
| 12 | main bus |
| 14, 16 | sub-buses |
| 14a, 14b, 14c | partial sub-buses |
| 16a, 16b, 16c | partial sub-buses |
| 18, 20, 22, 24, 26 | memory unit buses |
| 28, 30, 32, 34 | |
| 36 | strip line |
| 38 | vias |
| 40 | auxiliary bus |
| 42 | auxiliary input |
| 44, 46 | ESD structure |
| 48 | auxiliary bus |
| 50 | virtual memory unit |
| 52 | capacitor electrode |
| 54 | counter electrode |
| 56 | dielectric |
| 58 | capacitor terminal structure |
| 60 | capacitor via |

What is claimed is:

1. A branched command/address bus architecture between a memory register and a plurality of memory units, comprising:
   a main bus connected to a memory register;
   a first sub-bus which is connected to the main bus and branches into a first number of memory unit buses, wherein each of them is connected to a memory unit associated with a command/address input; and
   a second sub-bus which is connected to the main bus and branches as follows:
   into a second number of memory unit buses, wherein each of them is connected to a command/address input of a memory unit associated with the same, wherein the second number is smaller than the first number, and into a number of auxiliary buses, wherein the number of auxiliary buses corresponds to the difference between the first number and the second number, wherein each auxiliary bus is capacitively loaded corresponding to the memory unit buses and does not serve for driving a memory unit.

2. The branched command/address bus architecture according to claim 1, wherein the capacitive load of the auxiliary bus is provided by an additional input of the memory unit comprising the same structure as the command/address input of this memory unit and being connected to the auxiliary bus.

3. The branched command/address bus architecture according to claim 1, wherein each auxiliary bus is connected to a capacitor whose capacity corresponds to the input capacity of the command/address input of the memory units.

4. The branched command/address bus architecture according to claim 1, wherein the memory units are DDR DRAM memory units.

5. The branched command/address bus architecture according to claim 3, wherein the capacitor is a printed capacitor.

6. A memory unit, comprising:
   a command/address input for receiving command/address signals via a memory unit bus from a memory register, wherein the command/address input comprises an input capacity; and
   an additional auxiliary input, comprising the same input capacity as the command/address input, the additional auxiliary input being a dummy input not for signal transfer.

7. The memory unit according to claim 6, wherein the additional auxiliary input comprises the same structure as the command/address input.

* * * * *